UNITED STATES PATENT OFFICE.

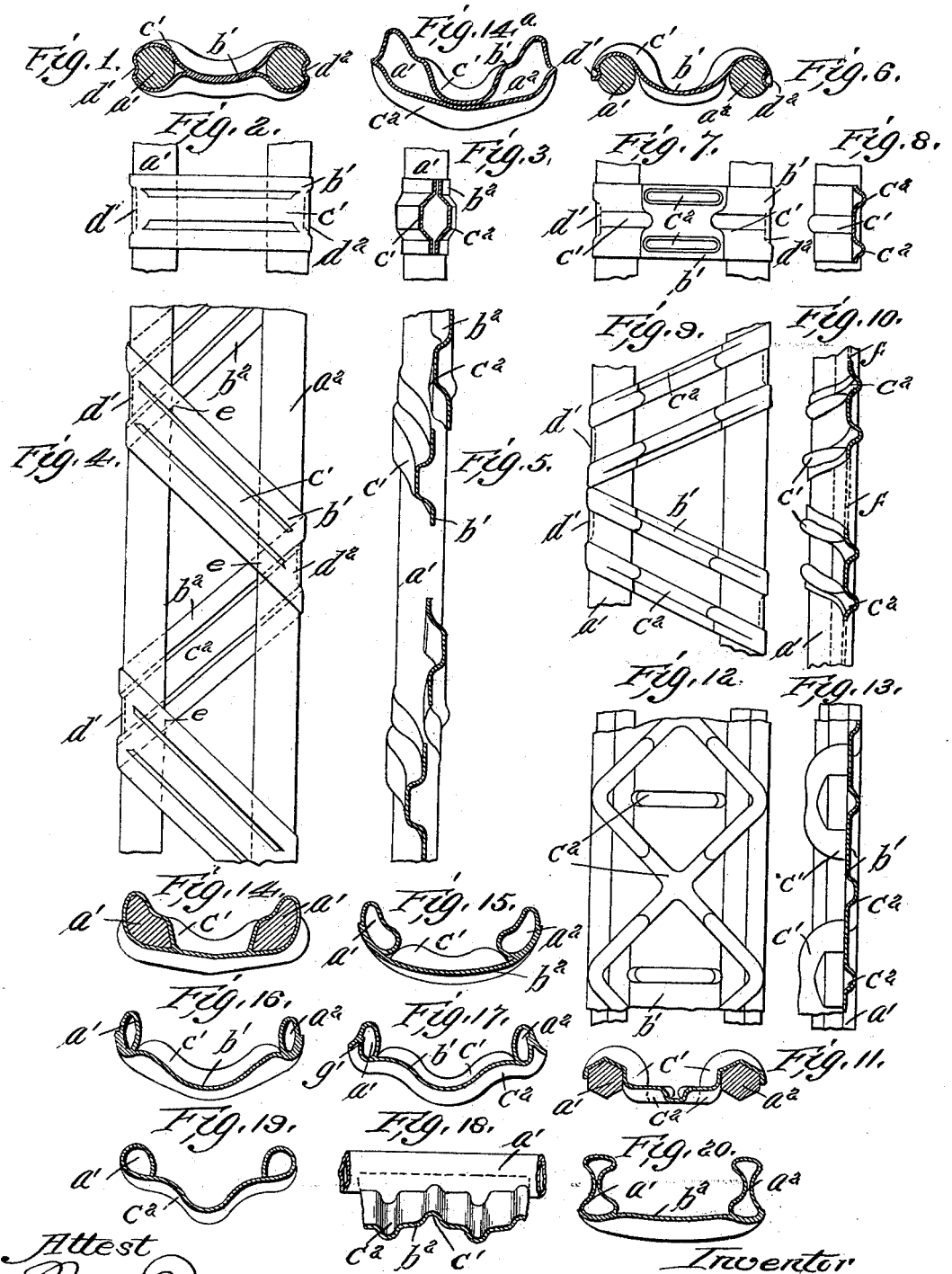

CLAUDE WILLIAM ATKINSON, OF PENARTH, ENGLAND.

WHEEL-RIM FOR CYCLES OR OTHER VEHICLES.

SPECIFICATION forming part of Letters Patent No. 619,246, dated February 7, 1899.

Application filed September 9, 1898. Serial No. 690,594. (No model.)

*To all whom it may concern:*

Be it known that I, CLAUDE WILLIAM ATKINSON, a subject of the Queen of Great Britain and Ireland, and a resident of Penarth, in the county of Glamorgan, England, have invented a new and useful Improvement in and Relating to the Wheels and Frames of Cycles or other Vehicles, (for which I have made application for Letters Patent in Great Britain under No. 23,252, bearing date the 9th day of October, 1897,) of which the following is a specification.

My invention relates to bicycles, tricycles, and similar machines or motor cars or carriages, and has for its object the arrangement and construction of those parts forming the wheels on which the machine runs and also the frame or frames of the machine on which the load is supported and carried by the wheels, whereby considerable decrease in weight of these parts can be obtained without reduction in strength. The wheels of this class of machinery are of the kind known as "tension-wheels"—that is to say, the hub or center is suspended in the center of the wheel by means of spokes, radiating from the hub to the rim, of small diameter which are subject to tensional forces only. In order to reduce the amount of displacement of this hub when subject to the normal forces due to loading or use of the machine, the spokes are subjected to an amount of initial tension by means provided for that purpose which induces corresponding initial compressive forces on the felly or rim.

My invention consists in the construction of the felly or rim in a specific manner, hereinafter described, and has for its object the construction of the same so as to reduce its weight to the smallest amount without decreasing the strength below that required.

In tension-wheels as usually constructed the rim or felly is made of thin sheet metal rolled to a suitable section to receive a tire of the desired pattern or of wood shaped to a corresponding section.

The usual patterns of metal rims may be divided into three classes—first, solid U-rims, which consist of a single sheet of metal rolled to U shape in section, with or without curved edges, and shaped to engage with the tire; second, hollow rims made up of a tube with one surface rolled so as to give a concave section toward the tire and shaped to engage with it, and, third, double-tube rims in which each edge of a solid U-rim has a tube formed on or attached to it.

The spokes are formed of wire having one end passed through a hole in a flange on the hub, while the other end has a screw-thread formed on it which is held in a nut or nipple of metal attached to the rim or felly, so that by rotating the nut the end of the spoke may be screwed farther into the nut or nipple and the tension on the spoke increased.

The rim of a wheel is when in use subjected to forces acting upon it in two planes—first, those acting in the plane of the wheel, and, secondly, those acting in a plane at right angles to this. The first set, or those acting in the plane of the wheel, tends to alter the circular shape of the wheel and produces pressures acting along the length of the felly and varying uniformly throughout its width the amount of compression parallel to its axis. At the same time, owing to the rim being curved and subject to these compressive forces, the various parts of the rim are subject to forces tending to produce bending of the several parts in the plane of the wheel, the magnitude of the bending movements varying with the distance of the point from the spokes and being inversely proportional to the number of spokes. The second set of forces, or those acting in a plane at right angles to the plane of the wheel, tends to buckle the wheel or bend it out of its normal plane of revolution. At the point of application of the resultant of these external forces they produce a simple bending action on the rim in a plane at right angles to the plane of the wheel, giving rise to forces along the rim, but in opposite directions, on the two sides of it, while at other points in the rim there is in addition to a bending action a couple tending to produce rotation about an axis parallel to the axis of the rim. In order that the rim may resist these several forces, it must be possessed of rigidity in the plane of the wheel, rigidity in a plane parallel with the axis of the rim at right angles to the plane of the wheel, and torsional rigidity in a plane at right angles to the axis of the rim and at right angles to the plane of the wheel. In order to make a rim having these several degrees of rigidity with the smallest amount of material, I form it of two similar and separate rods of wood or similar material of suitable section or two similar and separate tubes of metal of suitable section, which I place parallel to one another and as far apart as the width of the wheel will allow, and I cause these rods or tubes to resist the forces acting in the plane of the wheel—that is, those of simple compression acting parallel with the axis of the rim and the bending actions in the plane of the rim which arise from those compressive forces—and in order to enable them to resist the bending actions in the plane of the axis of the rim at right angles to the plane of the wheel I brace them together, so as to maintain them at a fixed distance apart, so that the rim forms, as it were, a girder of which these rods or tubes form the top and bottom booms separated by a web, which may be either of the open-lattice form or plate web with suitable stiffening members, while to give the necessary torsional rigidity in a plane at right angles to the axis of the rim and at right angles to the plane of the wheel I so shape the rods or tubes that they are individually torsionally rigid, and I brace them together by a bracing which is adapted to resist bending actions at right angles to its plane, and I so attach the rods or tubes to the bracing that their relative position cannot be altered—that is, so that rods or tubes cannot revolve relatively to the bracing on an axis parallel with their own axes.

In order that my invention may be more clearly understood, I will now proceed to describe it, reference being had to the accompanying drawings and to the letters marked thereon, like letters referring to like parts in the several figures.

Figure 1 is a section through a rim made according to my invention at right angles to the axis of the rim. Fig. 2 is a plan of a portion of the same. Fig. 3 is a section through the same parallel to the axis of the rim and in the plane of the wheel. Fig. 4 is a plan of a rim of slightly-different design. Fig. 5 is a section through the same parallel to its axis and in the plane of the wheel. Fig. 6 is a section through a modified rim at right angles to its axis. Fig. 7 is a plan of a portion of the same. Fig. 8 is a section along the axis of the same in the plane of the wheel. Fig. 9 is a plan of another form of the rim. Fig. 10 is a section along the axis of the same in the plane of the wheel. Fig. 11 is a section through another form of rim at right angles to its axis. Fig. 12 is a plan of a portion of the same. Fig. 13 is a section along the axis of the same in the plane of the wheel. Figs. 14, 14$^a$, 15, 16, 17, and 19 are sections through different forms of rims made to take tires of the "Dunlop" type. Fig. 18 is a section along the axis of the rim in the plane of the wheel of the type of rim shown in Figs. 16 and 17. Fig 19 is a section of rim in which the tubes are made by bending over the edges of the connecting-strip. Fig. 20 is a section through a rim made to take a tire of the "Palmer" or similar type.

In Figs. 1, 2, and 3 I show a rim built up of two circular rods $a\ a'$, placed parallel to one another and as far apart as the width of the wheel will allow. These two rods are held at a fixed distance apart by means of a series of thin metal connecting-strips $b'\ b^2$, placed at intervals throughout the length of the rim, which are shown in section by the dark lines, having corrugations $c'$ and $c^2$ formed on them by stamping or pressing the corrugations, extending right along and being parallel to the length of the strip and formed for the object of stiffening the strip and giving it rigidity to withstand forces acting in planes at right angles to its length. The central part of the strip $b'$ is depressed so as to form a U or crescent shaped rim for use with a tire of circular section. The connecting-strips $b'$ and $b^2$ may be formed of two separate pieces of metal, or they may be made of one piece and bent around the rods, so as to include them, and the ends either left free or united by soldering, brazing, or riveting, or they may be formed out of a piece of tube pressed to the required shape, as shown, and then threaded into the rods. In place of having the connecting-strips $b'$ and $b^2$ at right angles to the rods they may be inclined to them in a similar manner to that shown in plan in Fig. 9. In order to prevent the connecting-strips moving along the rods parallel to their axes, and also to rigidly attach them to the rods to give the necessary torsional rigidity to the rim, as explained, I form depressions $d'$ and $d^2$ in the ends of the strips, which engage with corresponding depressions in the rods, or I may put rivets or pins through the strips and pin them to the rods, and I sometimes prefer to cement the strip to the rods.

In Figs. 4 and 5 I have shown a modification of this form of rim, in which in place of the strip $b'$ lying exactly over the strip $b^2$ and being arranged either at right angles or inclined to the rods $a'$ and $a^2$ the strips $b'$ and $b^2$ are inclined to one another and form a continuous spiral over and under the rim alternately. They may, in fact, be conveniently made of a continuous strip wound round and round the rim. They may, if desired, be secured together where they overlap at $e$ by means of screws, rivets, or soldering or brazing. For clearness I have only shown one such spiral arrangement of strips; but it is frequently convenient to arrange another set of spiral strips between those shown, so that they cross one another in the center, and it will be seen that both in this case and in the rim shown Figs. 1, 2, and 3 separate strips may be replaced by a continuous series of strips formed by placing the strips close together, so as to touch one another, or by making them of a continuous strip of metal rolled to the crescent shape and surrounding the rods on either side, having corrugations $c'$ and $c^2$ formed at invervals either at right angles or inclined to the rods and either lying directly over one another, as in Fig. 2, or crossing one another, as in Fig. 4. The two continuously-corrugated strips thus formed may be brazed or soldered together along the line joining the centers of the depressions $d'$ and $d^2$.

In Figs. 6, 7, 8, 9, and 10 I have shown a similar arrangement of rim, but with the bracing between the two rods $a'$ and $a^2$ formed of one piece or strip $b'$ only, which has two sets of corrugations $c'$ and $c^2$ stamped into it. As before, torsional rigidity is secured by fixing the rods to the bracing by means of pins, cement, or the depressions $d'$ and $d^2$. In this case also the bracing may be formed of a continuous sheet or strip, as shown by the dotted lines $f$.

In Figs. 11, 12, and 13 I have shown the bracing made of a continuous strip $b'$, having corrugations $c'$ and $c^2$ formed in it to give the necessary stiffness to maintain the two rods $a'$ and $a^2$ at the fixed distance apart and to give the rigidity for resisting forces at right angles to the plane of the strip which is required to give tensional rigidity. In this case the rods are prevented from revolving about their axes with reference to the bracing by being made polygonal and engaging with similarly-shaped recesses in the bracing.

In Fig. 14 I show a section of a similar rim made to suit the type of the pneumatic tire known as "Dunlop," or tires fixed in position by means of inextensible wires in the edges of the cover. It is in all respects similar to the rims already described, with the exception that the rods are made of a suitable shape to engage with the different types of tire, and being of polygonal section the shape prevents the relative rotation between the rods and the bracing. The bracing may be of similar type to that shown in plan in Figs. 2 and 4, or continuous, as already explained. It will be understood that in all the arrangements illustrated in Figs. 1 to 14 the rods may be replaced by tubes of similar section, and in those cases in which rims of the type shown in Figs. 1 to 5 are constructed with continuous corrugated strips, so as to form rims of the second or hollow type, the rods or tubes $a'$ and $a^2$ may in some cases be omitted, leaving walled members built up of the outside element of the connecting-strips $b'$ and $b^2$.

In Figs. 14ª, 15, 16, 17, and 18 I have shown rims suitable for a tire of the "Dunlop" type, with the outer members composed of tubes of various sections connected by bracing-strips of similar design to those shown in Figs. 6 to 13 and attached thereto by means of brazing or soldering.

In Fig. 17 I show the outer corrugations $c^2$ brought far up on the outside of the tubes $a'$ and $a^2$ and closed at the ends by means of the flaps $g'$ and $g^2$, which may be formed out of the metal of which the tubes $a'$ and $a^2$ are formed.

In Fig. 19 I show a form of rim in which the tubes $a'$ and $a^2$ are made by bending over the edges of the connecting-strip $b^2$, this connecting-strip $b^2$ being formed in one continuous length and having corrugations $c^2$, stamped or rolled into it, disposed at right angles or obliquely to the axis of the rim. The edges of the tubes $a'$ and $a^2$ thus formed may be attached to the body of the strip $b^2$ by soldering, brazing, or riveting.

Fig. 20 shows a type of rim made so as to suit tires of the Palmer type, and in this case the tubes $a'$ and $a^2$ are rolled to a shape suitable to engage with the tire and are attached to the connecting-strip $b^2$ by soldering or brazing, as before.

It will be clearly understood that I may form the rods or tubes $a'$ and $a^2$ into any of the various shapes required for engaging with the different types of tires.

I am aware that rims have been previously made having tubular edges, these tubes being either formed out of the same strip of metal as the center part of the rim or attached thereto by brazing, such as Westwood's British Patent No. 1,925, 1893; but these rims have differed essentially from those now described by me by having the central part or web of the rim made of plain thin metal, which possessed little or no rigidity in a plane at right angles to the axis of the rim, and owing to the fact that this portion of the rim has to be depressed below the side tubes to accommodate the tire it is subjected to bending stresses when forces act on the tubes at its edges in a plane at right angles to the plane of the wheel. The side tubes can then approach or recede from one another, and, in fact, in some cases this motion is necessary to achieve the essential retaining function of the rim upon the tire.

I am also aware of rims composed of side members for taking the forces in the plane of the wheel and adapted with means for bracing them together either continuously with sheet metal or at points with lattice-work or struts, such as Birdsall's United States Patent No. 268,609. I am further aware that rims have been produced having corrugations at or near the bottom of the trough or concave side of the rim, having for their main object the reception of the nipples for the spokes, such as Wasdell and Taylor's British Patent No. 9,791, 1897. I am further aware that rims have been made having transverse corrugations extending up to and dying away at the edges of the rim, such as Hide's British Patent No. 17,625, 1893; but it will be seen that in these two latter cases the corrugations, which are situated at the bottom of the trough, do not achieve the object I desire to obtain—viz., the stiffening of the rim in a transverse direction, while those extending nearly or up to the edges of the rim prevent the rim from being able to resist forces acting along it or bending actions acting in the plane of the rim. Although I have described these arrangements in connection with the wheels of cycles and the like, I would have it understood that I may use the method of constructing the rim for constructing the compression members of the frame of a bicycle or tricycle, motor-car, or the like when the frame consists of such a member maintained in a state of initial compression by means of spokes radiating from a center or centers.

The arrangement of spokes may be of any of the well-known forms, and the spoke ends may be attached to the rims in any of the usual ways.

Having now particularly described and ascertained the nature of my said invention and in what manner the same is to be performed, I declare that what I claim is—

A wheel-rim comprising the parallel tubular side members adapted to withstand forces acting in the plane of the wheel and a continuous medium connecting said side members and having corrugations extending between said side members across the connecting medium, said corrugations extending also partially around the side members, substantially as described.

In witness whereof I have hereunto set my hand in presence of two witnesses.

CLAUDE WILLIAM ATKINSON.

Witnesses:
RICHARD A. HOFFMAN,
CHARLES CARTER.